United States Patent [19]
Duschl

[11] Patent Number: 4,542,404
[45] Date of Patent: Sep. 17, 1985

[54] CHARGE COUPLED DEVICE BASED SYSTEM AND METHOD FOR INSPECTING AND MODIFYING IMAGES

[75] Inventor: Robert A. Duschl, Lancaster, Pa.

[73] Assignee: RCA Corporation, Princeton, N.J.

[21] Appl. No.: 388,037

[22] Filed: Jun. 14, 1982

[51] Int. Cl.⁴ .............................................. H04N 7/18
[52] U.S. Cl. .................................. 358/106; 358/101; 358/213; 356/237
[58] Field of Search ............... 358/106, 105, 107, 213, 358/101, 111; 356/390, 392, 394, 237; 382/8, 34; 340/794, 5, 6, 708

[56] References Cited
U.S. PATENT DOCUMENTS

| | | | |
|---|---|---|---|
| 4,164,728 | 8/1979 | Marsh | 382/34 |
| 4,319,221 | 3/1982 | Sakoe | 382/34 |
| 4,378,495 | 3/1983 | Miller | 358/106 |
| 4,398,213 | 8/1983 | Haendle et al. | 358/111 |
| 4,448,532 | 5/1984 | Joseph et al. | 356/394 |

Primary Examiner—Edward L. Coles
Attorney, Agent, or Firm—E. M. Whitacre; D. H. Irlbeck; L. L. Hallacher

[57] ABSTRACT

A system for inspecting images projected onto a charge coupled device (CCD) compares the image cast onto the CCD by an object to be inspected with an optimum reference image to identify and locate faults in the object being inspected, or to modify the image to match the reference.

15 Claims, 2 Drawing Figures

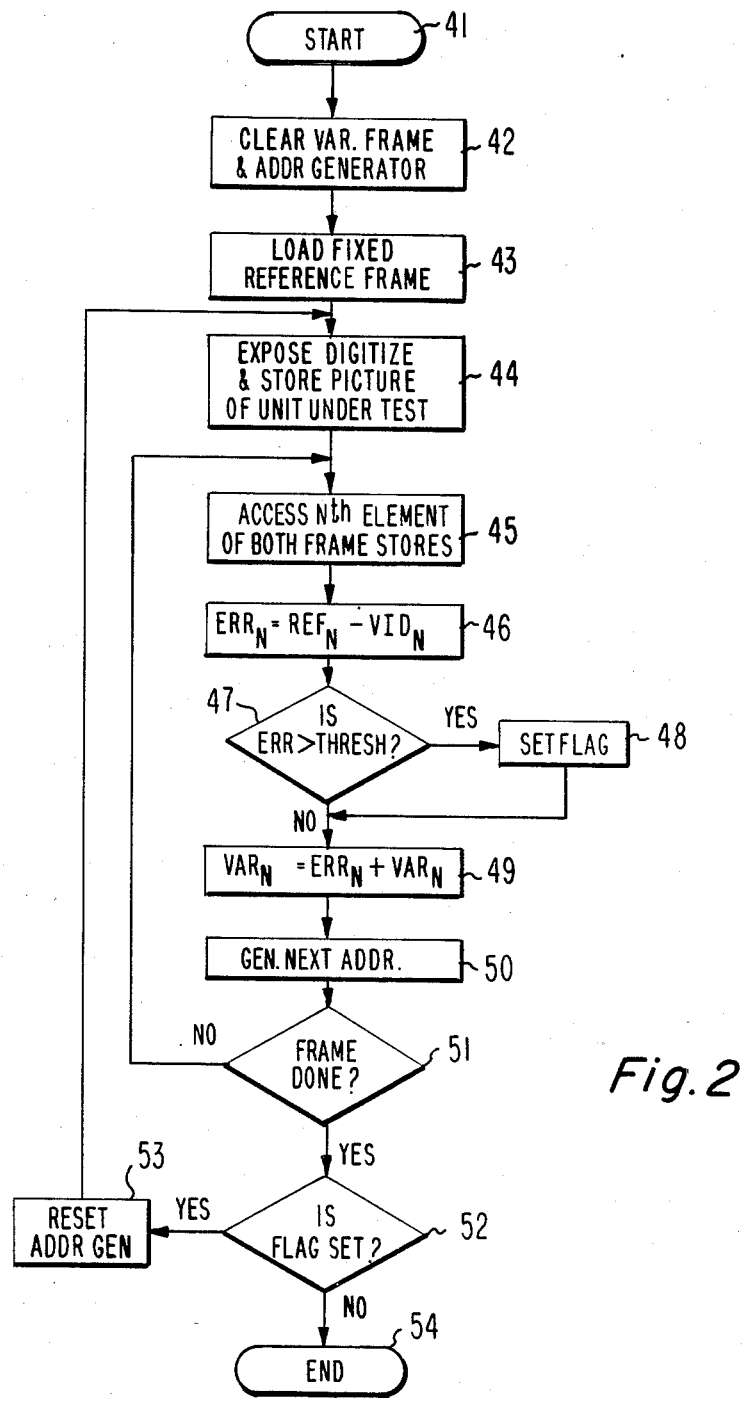

CHARGE COUPLED DEVICE BASED SYSTEM AND METHOD FOR INSPECTING AND MODIFYING IMAGES

BACKGROUND OF THE INVENTION

This invention relates generally to systems and methods employing a charge coupled device (CCD) and particularly to such a system and method for inspecting or modifying images projected onto the CCD.

Charge coupled devices are finding use in a wide range of equipment requiring image sensing, such as inspecting or modifying elements by examining the images cast by the elements into the CCD. CCDs are used in conjunction with an optical lensing system which focuses the light from the object being investigated onto the CCD. Varying amounts of light on the individual pixels, or light sensitive material locations, within the CCD array charge the pixels to different levels proportional to the incident light. The optical information from the object is, therefore, available in analog form across the pixels of the CCD array. The analog information is shifted out of the CCD and converted into digital form and stored in a digital memory where the various characteristics of the object can be investigated by the proper manipulation of the digital information. The individual pixels within a CCD array typically are closely spaced and are arranged horizontally in rows and vertically in columns so that a given CCD imaging device will provide a fixed number of pixels of information. As an example, the SID52501 CCD presently available from RCA Corporation has 320 vertical columns of pixels and 512 horizontal rows of pixels. Accordingly, the information is read out from the CCD and stored in 320 vertical columns and 512 horizontal rows.

One use for CCDs is that of inspecting objects by examining the images cast by the objects onto the CCD. As an example, the object being inspected can be a production CCD. An optimum CCD, or a programmable digital processor, is used to provide a reference field. The data from the reference are stored in a reference frame store. A production CCD is then imaged and the data received therefrom are compared, pixel by pixel, to the reference field data from the optimum CCD or the digital processor. The exact locations of faults in the production CCD are thus identified. Alternatively, the initial image can be provided by a high resolution CRT whereby the image can be varied pixel by pixel. The data representative of a desired image are placed into the reference store and compared with the data received from an actual image on the CRT screen. The difference between the two images is then used to change the CRT image on a pixel by pixel basis until the data from the projected image matches the data representative of the reference image. The projected image can then be photographed to produce a complex transmission characteristic which otherwise is difficult, or impossible, to produce.

The instant invention utilizes the advantages of a CCD by the provision of a CCD based image inspection system and method wherein the image cast by an object, such as another CCD, is compared with a reference image to identify the locations of faults, or to modify the image.

CROSS REFERENCE TO RELATED APPLICATIONS

Application Ser. No. 388,143 now U.S. Pat. No. 4,454,545 entitled "Charge Coupled Device Based Inspection System and Method" filed June 14, 1982 by R. A. Duschl describes a system in which the claimed invention can be used.

SUMMARY OF THE INVENTION

A system for inspecting images projected onto a charge coupled device (CCD) compares the image cast onto the CCD by an object to be inspected with a reference image to identify and locate faults in the object being inspected, or to modify the image to match the reference.

BRIEF DESCRIPTION OF THE DRAWINGS

FIG. 2 is a flow chart of a preferred embodiment of an image inspection system reduced to practice using software.

DETAILED DESCRIPTION OF THE PREFERRED EMBODIMENT

Figure 1:
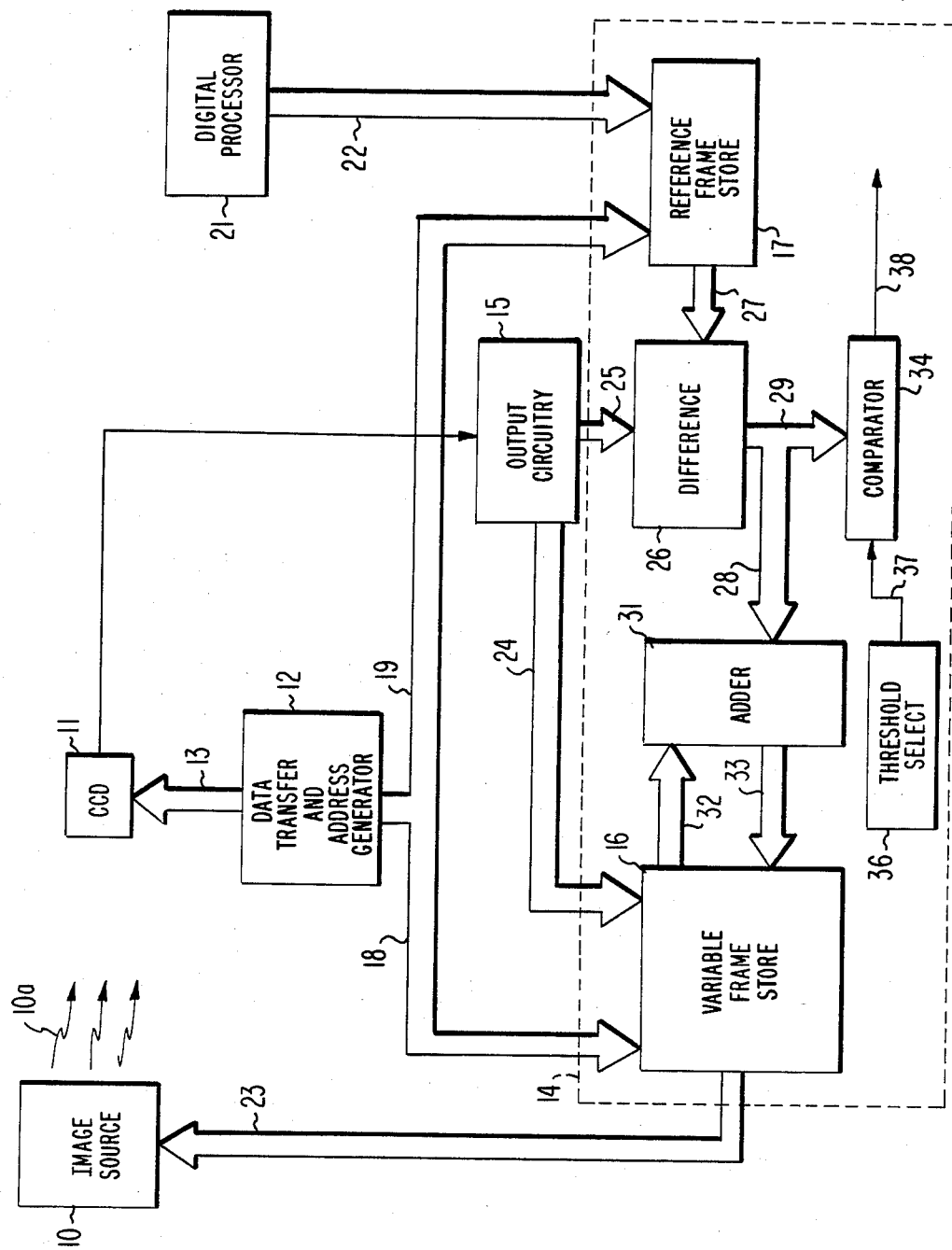
FIG. 1 is a CCD system incorporating a preferred embodiment of an image inspection system reduced to practice using hardware.

FIG. 1 shows a system including a charge coupled device (CCD) 11 for inspecting an image source 10. The object being inspected can be another CCD, a light image, a high resolution cathode ray tube (CRT) or other type of image source. The light rays 10a eminating from the image source 10 impinge upon the CCD and each pixel of the CCD is charged proportionately to the amount of light energy received. A data transfer and address generator 12 is coupled to the CCD 11 by output lines 13. The data transfer and address generator 12 controls the transfer of the analog information from the CCD to an image inspection system 14 through output circuitry 15. The transfer of the data from the CCD can be effected in a manner described in U.S. Pat. No. 4,454,545, or in any other manner within the purview of one skilled in the art.

The data transfer and address generator 12 communicates with a variable frame store 16 and a reference frame store 17 through connecting lines 18 and 19, respectively. The reference frame store 17 also communicates with a digital processor 21 through the connection 22. The digital processor 21 can be a PROM, EPROM or RAM depending upon the flexibility and speed required for the particular inspection being performed. The variable frame store 16 also is coupled to the image source 10 by a line 23. In operation, the image source 10 generates or otherwise provides a light image which is projected onto the CCD 11 to charge each pixel within the CCD array proportionately to the amount of impinging light. The analog data on the CCD are read out to the output circuitry 15 and converted to digital information representative of the light image provided by the image source 10. The digital image data are then processed by the image inspection system 14 to either inspect or modify the image projected onto the CCD 11 by the image source 10.

The output circuitry 15 communicates with the variable frame store 16 by way of a connection 24. As the data transfer and address generator 12 transfers the analog data from the CCD 11 to the output circuitry 15, the data addresses for the variable frame store 15 and reference frame store 17 are communicated by way of connections 18 and 19 respectively. Accordingly, the data transferred from the CCD and the reference data are addressed so that the image data from the CCD can be compared with the reference data from the reference frame store 16 on a pixel by pixel basis. The image source 10 is a high resolution light source the output of which is variable on a pixel by pixel basis. Thus the image source 10 can be a high resolution CRT which is used to generate any desired image.

The present system also is useful in inspecting production type CCDs. In this mode of operation the image source 10 generates a white field and an optimum, or reference, CCD is used as the CCD 11. The white field from the image source 10 is projected onto the reference CCD to provide reference field data to the reference frame store 17. Alternatively, the reference field data can be provided by the digital processor 21 because the optimum output data from an optimum CCD are known. After the reference CCD data are stored in the reference frame store 17, the reference CCD is replaced by a production CCD without changing the white field provided by the image source 10. The production CCD is then exposed to the white field and the data provided to the variable frame store 16. The data from the reference CCD and the production CCD are respectively addressed to the reference frame store 17 and the variable frame store 16, and the image data from the production CCD can be compared with the reference data from the optimum CCD on a pixel by pixel basis. A pixel by pixel comparison of the production CCD with the reference CCD data identifies the pixel locations of all faults within the production CCD.

The system is also useful for creating complex transmission patterns on regular photographic film. As an example, frequently in optical spacial filtering, a photographic aperture having a two dimensional Gaussian transmission gradient rather than the typical circular aperture is needed. Such a Gaussian transmission aperture can be generated using the inventive system. The digital processor 21 is used to generate a digital picture of the desired transmission pattern and to load the data representive of the desired pattern into the reference frame store 17. The same digitized pattern is fed to the image source 10 to provide a best effort at generating the desired pattern. The best effort pattern is imaged onto a CCD and the image data from the CCD 11 are then compared with the reference data in the frame store 17. The differences between the data from the CCD 11 and the reference frame 17 are then provided to the variable frame store 16 on a pixel by pixel basis. The modified data in the variable frame store 16 are then provided over the coupling 23 to modify the image output from the image source 10. The modified image from the image source 10 is again projected onto the CCD and compared with the reference data in the reference frame store 17. This operation continues until the image received by the CCD 11 from the image source 10 is identical to that within the reference frame store 17 at which point the desired Gaussian transmission gradiant is provided by the image source 10. The CCD 11 is then replaced with a film camera and exposed to the light source to produce the desired Gaussian aperture on the photographic film.

The image inspection system 14 includes a difference circuit 26 which receives the digitized pixel data from the output circuit 15 by way of a coupling 25. The difference circuit 26 also receives the reference pixel signals from the reference frame store 17 over the coupling 27. The difference circuit 26 compares the pixel data from the CCD with the reference pixel signals from the reference frame store 17 on a pixel by pixel basis to provide difference signals on the output lines 28 and 29. The output line 28 of the difference circuit 26 serves to provide the difference signals at an input to an adder means 31. The adder means 31 bilaterally communicates with the variable frame store 16 by way of couplings 32 and 33. The difference signals on the output coupling 29 of the difference circuit 26 serves as an input to a comparator 34 which also receives a threshold value from the threshold select circuit 36.

The pixels of the CCD are arranged in horizontal rows and vertical columns. During the transfer of data from the CCD, the data available on the individual pixels are read out serially from one horizontal row. When the row is empty the complete data field is shifted vertically one row to permit the serial removal of the next row from the CCD. This operation continues until all the pixel data is transferred from the CCD to the output circuitry 17. The data transfer and address generator 12 simultaneously addresses the variable frame store 16 and the reference frame store 17. Accordingly, when the pixel data from one pixel is received by the output circuitry 17 the pixel data is provided by the line 27 to the difference circuit 26. Simultaneously the reference pixel signal from the reference frame store 17 is provided to the difference circuit 26 to provide the difference signal for the particular pixel being investigated to the adder 31. Simultaneously the pixel data from the output circuitry 15 is provided to the variable frame store 16. This pixel data signal is provided by the variable frame store 16 over output line 32 to the adder 31. The pixel data and the difference signal are added by the adder 31 and provided by the output circuitry to the variable frame store 16 so that the pixel data is replaced by the modified pixel signal which results from the addition of the pixel data in the pixel difference signal. This operation continues on a pixel by pixel basis until all the pixel data signals are scanned from the CCD 11 and modified in the variable frame store 16. The modified signals in the frame store 16 can then be used to modify the image provided by the image source 10 or used as an indication of the quality of the CCD 11 from which the data have been received.

The image inspection system 14 can also be used to immediately reject an image being investigated. The difference signal from the difference circuit 26 is provided by the output line 29 to the comparator 34. A threshold select switch 36 provides a threshold value for the difference signal and provides the threshold value to the comparator 34 by way of the output line 37. Some variations in the image intensity are permitted and the threshold value is selected to permit the allowable variation by comparing the difference signals from the difference circuit 26 with the permitted threshold value from the threshold select switch 36. When the difference signal is different from the threshold value by less than a preselected maximum an acceptable image has been received. However, when the difference signal is different from the threshold value by more than the predetermined maximum, an unacceptable pixel has been detected in the image projected onto the CCD 11 and a flag signal is provided on the output line 38 of the comparator 34.

FIG. 2 is a flow chart of a preferred embodiment when the image inspection system 14 of FIG. 1 is reduced to practice utilizing software. Thus, when the digital processor 21 of FIG. 1 has sufficient memory capacity all the elements contain within the image inspection system 14 of FIG. 1 can be replaced by properly programming the digital processor. The routine is entered at the start function 41 and as indicated at function 42 the variable frame store and address generator are cleared. At functional block 43, the reference frame is loaded into the frame store. The CCD is exposed to the image and the output digitized and stored as indicated at functional block 44. At functional block 45, one pixel of the variable frame store and the reference frame store are simultaneously accessed to provide the difference signal as indicated at functional block 46. At decision block 47, the difference signal is compared with the threshold level and if the difference signal exceeds the threshold by more than a predetermined maximum the flag is set as indicated at functional block 48. When the difference signal is in tolerance functional block 49 is entered to provide the modified signal to the variable frame store. The next pixel is then addressed at functional block 50. This operation continues until the complete CCD is scanned as indicated at functional block 51. After the complete CCD is scanned, decision block 52 is entered and when a flag is set because a difference signal exceeds the threshold value functional block 53 is entered to reset the address generator and repeat the inspection of the image to verify that the flag indication did not result from an erroneous inspection. When the flag is not set at functional block 52, the routine is ended as indicated at 54.

What is claimed is:

1. A system for inspecting an image projected onto a CCD from an image source wherein said CCD stores pixel data from said image on a plurality of pixels comprising:
    output circuitry and a data transfer and address generator for transferring frames of said pixel data from each of said CCD pixels to said output circuitry whereby said data from each of said pixels has a unique address;
    means of storing a reference frame representative of a reference image, said reference frame having an optimum reference pixel signal for each of said CCD pixels;
    variable frame store means for initially storing said CCD pixel data, and wherein said CCD pixel data are sequentially replaced by modified pixel signals for each pixel of said CCD; and
    means for receiving and for comparing said pixel data and said reference pixel signals, and providing said modified pixel signals to said variable frame store means whereby a frame of modified pixel data exists in said variable frame store means.

2. The system of claim 1 wherein said means for receiving and comparing includes difference circuit means for providing a difference signal representative of the difference between said CCD pixel data and said reference pixel signals for each pixel of said CCD.

3. The system of claim 2 wherein said means for receiving and comparing further includes adder means for adding said CCD pixel data and said difference signals and providing said modified pixel signals.

4. The system of claim 3 further including means for selecting a threshold value for said difference signal and comparator means for comparing said threshold value and said difference signal and providing a flag output when said difference signal differs from said threshold value by a predetermined maximum.

5. The system of claim 4 further including a programmable digital processor for providing said reference image.

6. The system of claim 1 wherein said image source is a production CCD and said reference image represents the data from a reference CCD.

7. The system of claim 6 wherein said means for receiving and comparing includes difference circuit means for providing a difference signal representative of the difference between said reference CCD pixel data and said pixel signals.

8. The system of claim 7 wherein said means for receiving and comparing further includes adder means for adding said CCD pixel data and said difference signals and providing said modified pixel signals.

9. The system of claim 1 further including a programmable digital processor for providing said reference image.

10. A system for inspecting images projected onto a CCD from an image source wherein said CCD stores pixel signals from said image on a plurality of pixels comprising:
    output circuitry and a data transfer and address generator for transferring a frame of said pixel signals from each of said CCD pixels to said output circuitry whereby each of said pixel signals has a unique address;
    means for storing a reference frame representative of a reference image, said reference image having a reference pixel signal for each of said CCD pixels;
    variable frame store means for storing said pixel signals; and
    means for receiving said pixel signals and said reference pixel signals and providing difference signals representative of the difference between said pixel signals and said reference pixel signals.

11. The system of claim 10 further including means for selecting a threshold value for said difference signal and comparator means for comparing said threshold value and said difference signal and providing a flag output when said difference signal differs from said threshold value by a predetermined maximum.

12. A method of modifying an image projected onto a charged coupled device (CCD) comprising the steps of:
    transferring a frame of pixel image data from said CCD to a variable storage means;
    providing a reference frame having a reference pixel signal for each pixel of said CCD;
    providing a difference pixel signal in accordance with the difference between said pixel image data and said reference pixel signal;
    modifying said pixel image data in said variable storage means with said difference pixel signals to provide a frame of modified pixel image signals in said variable storage means.

13. The method of claim 12 further including the step of modifying said projected image with said modified image signals.

14. The method of claim 13 further including the step of comparing said difference pixel signals with a threshold value and providing a flag signal when said difference signal differs from said threshold value by a predetermined maximum.

15. The method of claim 14 further including the step of using a programmable digital processor to generate said reference image.

* * * * *